United States Patent [19]

Nagase et al.

[11] 3,739,577
[45] June 19, 1973

[54] HYDRAULIC SYSTEMS

[75] Inventors: Yukihiko Nagase; Mitsutoshi Yoshida; Yohichi Kimoto; Toyoshi Sakano, all of Nagoya, Japan

[73] Assignee: Mitsubishi Jidosha Kogyo Kabushiki Kaisha, Tokyo, Japan

[22] Filed: Apr. 19, 1971

[21] Appl. No.: 134,966

[30] Foreign Application Priority Data
Apr. 21, 1970  Japan.............................. 45/33465
Apr. 21, 1970  Japan.............................. 45/33466

[52] U.S. Cl. ............60/385, 180/79.2, 91/375 R, 60/392, 91/375 A
[51] Int. Cl......................................... F15b 15/18
[58] Field of Search ............... 60/52 S; 180/79.2 R; 91/375 R, 375 A

[56] References Cited
UNITED STATES PATENTS
3,233,408  2/1966  Markert et al............ 180/79.2 R X
3,463,260  8/1969  Baines et al...................... 60/52 SR
3,491,846  1/1970  Ohtsuka et al. ................. 60/52 S X

*Primary Examiner*—Edgar W. Geoghegan
*Attorney*—Cushman, Darby & Cushman

[57] ABSTRACT

The invention is a hydraulic system which includes a hydraulic pump, which is adapted to discharge a predetermined amount of oil per unit displacement of an actuating means, connected to a control unit. The control unit includes a housing in which there are two oil chambers, a communicating path interconnecting the oil chambers and permitting restricted flow of oil between the oil chambers, a movable member and resilient means tending to restore the movable member to a neutral position with respect to the housing. In operation when the hydraulic pump is actuated by the actuating means oil enters one of the oil chambers, creating a pressure difference between the oil chambers and giving rise to a force which displaces the movable member by an amount proportional to the velocity of displacement of the actuating means. The hydraulic system is useful with a steering system of a vehicle.

17 Claims, 20 Drawing Figures

HYDRAULIC SYSTEMS

This invention relates to hydraulic systems.

This invention is concerned with a hydraulic system in which an output can be produced which depends upon the velocity of displacement of some actuating means, or in which an output can be produced which depends upon both the amount of displacement and the rate of displacement of the actuating means.

The hydraulic system can be used, for example, in combination with the steering mechanism of a vehicle, in which case the actuating means can be the steering column of the vehicle steering mechanism and the displacement will be the angular displacement of the steering column. The hydraulic systems are particularly suitable for use with power-assisted steering systems. In a conventional power-assisted steering system in which the power is provided hydraulically, there are present both a control valve, which determines the direction of flow of hydraulic fluid upon steering movement of the steering wheel and steering column, and an actuator which is acted upon by the hydraulic fluid to cause the steerable wheels of the vehicle to move. In some power-assisted steering systems the control valve and the actuator are combined in one unit; such systems are hereinafter referred to as integral power steering systems. In other power-assisted steering systems the control valve and the actuator are present as two separate units which are linked hydraulically; such systems are hereinafter referred to as separate power steering systems. The hydraulic systems of the invention can be used with either integral or separate power steering systems.

According to the present invention there is provided a hydraulic system which comprises a hydraulic pump, which is adapted to discharge a predetermined amount of oil per unit displacement of an actuating means, connected to a control unit which includes a housing in which there are two oil chambers, a communicating path interconnecting the two oil chambers to permit restricted flow of oil between the two oil chambers, a member which is movable, from a neutral position relative to the housing, in response to a different in oil pressure between the said two oil chambers and resilient means which act upon the movable member to restore it to the said neutral position, the arrangement being such that upon displacement of an actuating means, the hydraulic pump discharges oil to one of the said oil chambers, thereby creating a pressure difference between the said two oil chambers which pressure difference causes displacement of the said movable member, whereby the movable member is displaced by an amount proportional to the velocity of displacement of the actuating means.

The rate at which the oil flows from the hydraulic pump to the one of the said two oil chambers is proportional to the velocity of displacement of the operating shaft. The resulting pressure difference between the two oil chambers is proportional to the rate of flow of oil and is therefore also proportional to the velocity of displacement of the operating shaft. The displacement of the movable member relative to the housing of the control unit is proportional to the pressure difference between the oil chambers. Therefore, the displacement of the movable member is proportional to the velocity of displacement of the operating shaft.

When a hydraulic system of the present invention is used with a power steering system of a car, the steering column of the vehicle steering mechanism serves as the actuating means, and the displacement of the movable member is proportional to the angular velocity of displacement of the steering column. The movable member is part of a valve which controls the flow of oil in the hydraulic system which provides the power assistance in the steering system.

The invention will be illustrated with reference to the accompanying drawings showing, by way of example, various embodiments of known power steering systems and of power steering systems in combination with embodiments of hydraulic systems in accordance with the invention, in which.

A known separate power steering system as disclosed in U.S. Pat. No. 3,491,846, is described with reference to FIG. 3. On a body frame 910 there is supported a gear box 912 which is connected to a steering shaft 916. The steering shaft is provided with a steering wheel 914 at one end. A pitman arm 918 is connected, at one end, to an output end of the gear box 912 and, at the other end, to a control valve 922 of the open center type. One end of a relay rod 920 is fixedly secured to the housing of the control valve 922, and the relay rod 920 is connected to tie rods 928. The tie rods serve to swing front wheels 924, which are pivotably supported on king pins (not shown), about the king pins through the intermediary of knuckle arms 926. A hydraulic pump 934 is connected by appropriate piping to provide a feed path for pressurized oil via the control valve 922 to an actuator 932. One end of the actuator is pivotably connected to the relay rod 920 and the other end is connected to the body frame 910 by means of a pin coupling.

Figure 3:
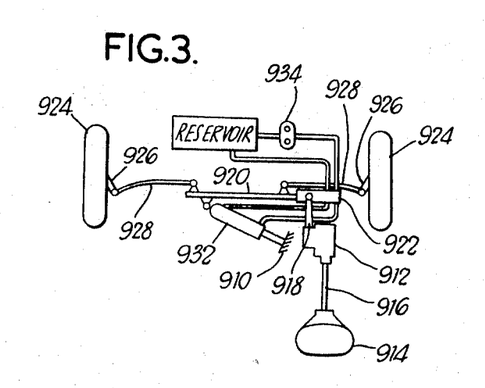
FIG. 3 is a schematic view of a known separate power steering system on a car.

When the steering wheel 914 is turned, the pitman arm 918 is displaced through the intermediary of the steering shaft 916 and the gear box 912. This displacement of the pitman switches the control valve 922 so as to lead the pressurized oil from the pump 934 to the actuator 932. The output displacement of the actuator 932 actuates the relay rod 920 to steer the front wheels 924.

Figure 4:
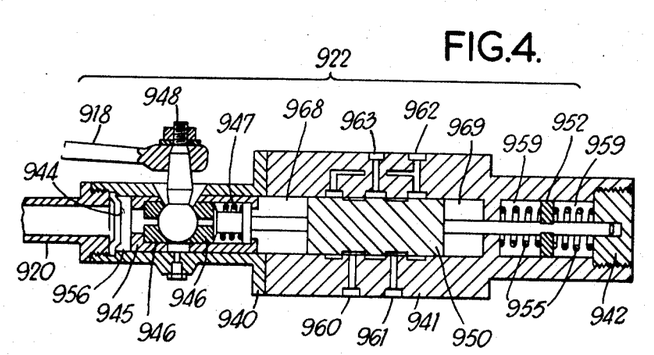
FIG. 4 is a detailed cross-sectional view of a switching valve used in the power steering system illustrated in FIG. 3.

The open center control valve is illustrated in greater detail in FIG. 4. The relay rod 920 is threadedly secured to an outer housing 940 of the control valve. A valve body 941 is fixedly secured to the outer housing 940 by means of bolts. An end plug member 942, which is threadedly secured to the valve body 941, serves also as a spring bearing for springs 955. Numeral 944 designates a dust cover. The outer housing 940, the valve body 941 and the end plug member 942, in combination, move with the relay rod 920.

The pitman arm 918 is connected to a ball stud 948, which is accommodated within an inner cylinder 945, and held by ball seats 946 on the opposite sides of the ball stud. A spring 947 to press the ball seats onto the ball stud 948 from one side thereof and a spool shaft 950 which also serves as a spool are provided. The pitman arm 918, inner cylinder 945, ball seats 946, spring 947, ball stud 948 and spool shaft 950 can slide together in the lengthwise direction of the spool shaft.

Ports 960 and 961 communicate with the actuator 932 and ports 962 and 963 communicate with the pump 934 and an oil reservoir, respectively. Numeral 956 designates a space which is necessary to permit movement of the inner cylinder 945. The space is filled with an oil or grease lubricant.

Chambers 959 are provided to accommodate springs 955, which are provided on the opposite sides of a stopper 952. The stopper 952 is fixedly secured to the spool shaft 950 and is movable integrally therewith. The springs have a centering function, acting upon the stopper 952 to urge the spool shaft 950 to a neutral position with respect to valve body 941. Numerals 968 and 969, respectively, designate spaces which can be occupied by the spool shaft 950 when it is displaced from its neutral position.

When the spool shaft 950 is at its neutral position with respect to the valve body 941, the pressurized oil fed to the port 962 is led directly to the port 963 as is conventional with an open center valve, and no oil flows through the ports 960 and 961. When the spool shaft 950 is displaced with respect to the valve body 941, the pressurized oil fed through the port 962 is led to either the port 960 or the port 961 depending upon the direction of displacement. Then the operating oil fed back from the actuator 932 to the other port 960 or 961, is led to the port 963, and thus returned to the oil reservoir. After repeated test runs the disadvantage with this system is that phase advancing is not achieved. This is due to the arrangement of the springs therein. In the instant invention, later to be described, a new arrangement by which the springs separate the spool for power steering and the valve in the phase advancing means, provides for phase advancement of the steering system.

Figure 5:
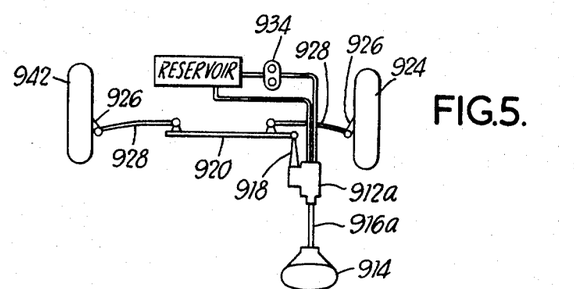
FIG. 5 is a schematic view of a known integral steering system on a car.

An example of a known integral power steering system is described with reference to FIG. 5. In this figure, those parts shown in FIG. 3 are given the same reference numerals and, except when necessary, are not described further. A gear box 912a is supported on a body frame (not shown) and connected to a steering shaft 916a which is provided with a steering wheel 914 at one end. The steering torque applied to the steering wheel 914 is amplified within the gear box 912a and the output is transmitted to a pitman arm 918 and then to a relay rod 920. The relay rod 920 is connected to tie rods 928 which serve to swing front wheels 924 which are pivotably supported on king pins (not shown), about the king pins by the intermediary of knuckle arms 926. A hydraulic pump 934 is connected by appropriate piping to provide a feed path for pressurized oil to a control valve within the gear box 912a.

The steering shaft 916a is displaced by operating the steering wheel 914, the displacement serving as an input displacement for the control valve within the gear box 912a to cause the control valve to switch the pressurized oil fed from the pump 934, and the output displacement from the gear box 912a is delivered to the pitman arms 918 to effect steering of the wheels 924.

Figure 6:
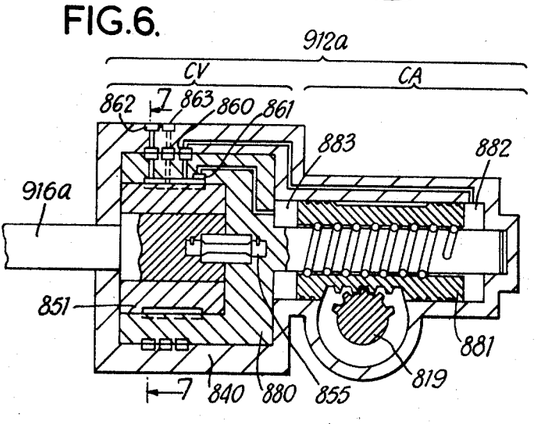
FIG. 6 is a detailed cross-sectional view of a switching valve used in the power steering system illustrated in FIG. 5.
Figures 7, 8:
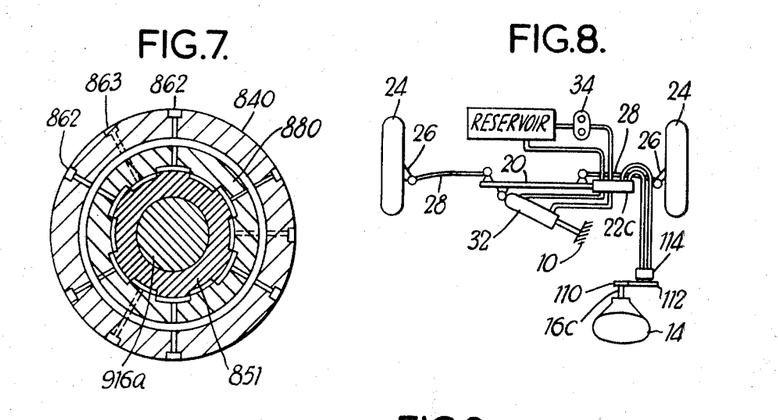
FIG. 7 is a transverse cross-sectional view taken along line 7—7 in FIG. 6.
FIG. 8 is a schematic view showing one example of a hydraulic system according to the present invention as applied to a separate power steering system for a car.

The gear box 912a is illustrated in greater detail in FIGS. 6 and 7. In FIG. 6, the section marked CV is an open center control valve, in the form of a rotary valve, corresponding to the member 922 in FIG. 3. The section marked CA is an actuator which corresponds to the actuator 932 in FIG. 3. A nut 881 and a pinion shaft 819 which is directly coupled to the pitman arm 918, function as reduction gears. It is to be noted that the nut 881 can serve also as a piston of the actuator. One end of a member 880 functions as an actuating shaft which is threadedly engaged with the nut 881 in the actuator section CA, and the other end of the member 880 serves as a housing for the rotary valve. When the actuating shaft is rotated, the nut 881 is subjected to a rectilinear motion in the lengthwise direction of the actuating shaft, which causes the pitman arm 918 to swing.

A housing 840 is fixedly secured to the body frame of the vehicle (not shown). A rotor 851 is situated around the outer periphery of the steering shaft (916a), and cooperates with the valve housing section of the member 880 in the rotary valve. A torsion bar 855 is fixedly secured to the steering shaft 916a and the member 880 by means of knock pins to perform a centering function between the steering shaft 916a and the member 880. Ports 860 ad 861 communicate with oil chambers 882 and 883 in the actuator section CA, port 862 communicates with the hydraulic pump 934 and port 863 communicates with the oil reservoir. When the rotor 851 is in a neutral position with respect to the housing section of the member 880, the pressurized oil fed to the port 862 is led directly to the port 863 as is conventional with an open center valve, and no oil flows through the ports 860 and 861. When the rotor 851 is displaced with respect to the member 880, one of the oil paths, either the one leading from the port 862 through the port 860 to the oil chamber 882 of the actuator, or the other leading from the port 862 through the port 861 to the oil chamber 883 of the actuator, is communicated with, depending upon the direction of displacement between the rotor 851 and the member 880. Then the oil led from the port 860 or 861 communicating with the other oil chamber is returned through the port 863 to the oil reservoir.

Another known steering system is depicted in French Pat. No. 1,544,401. In this patent it appears that the power steering system of the invention does not generate an output containing a differential component of the handle steering angle. This results from an interconnection of the oil discharged by the two pumps in two respective hydraulic systems. It is this interconnection that gives an output which is directly proportional to the angular displacement of the handle steering mechanism and not a differential thereof, thereby resulting in a conventional output.

Figures 1, 2:
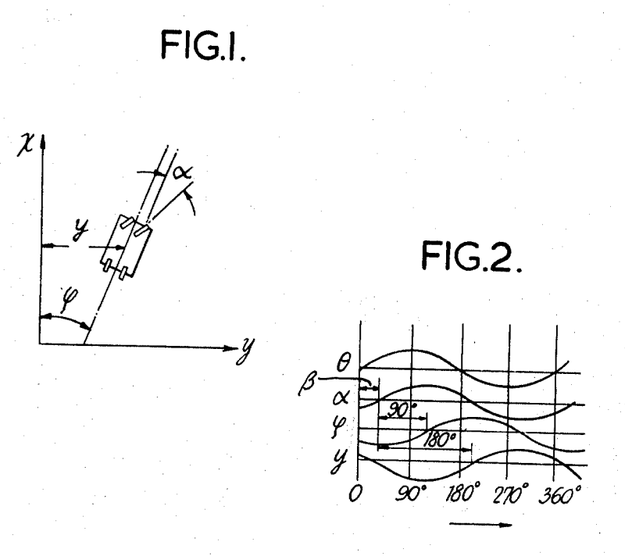
FIG. 1 is a plan view illustrating a car whose steerable wheels are at an actual steering angle $\alpha$, the car being at an attitude angle $\phi$ and a lateral displacement $y$.
FIG. 2 is a diagrammatic view illustrating steering characteristics of a car.

When driving a car equipped with the above-described known power steering system, there exist delays in response between the driver, the steering system and the car body system. Referring to FIGS. 1 and 2, and assuming that while moving in the x-direction a necessity for steering is recognized, there will occur a delay in phase of more than 90° between turning a steering wheel or handle through an angle $\theta$ and the car turning through an attitude angle $\phi$. Between the steering wheel or handle turning through the angle $\theta$ and a lateral displacement of the car $y$ there will occur a delay in phase of more than 180°. As a consequence of this delay, the known power steering systems have a disadvantage that during high speed driving, they are liable to cause mistakes in driving and result in an accident.

The present invention will now be illustrated in more detail by reference to preferred embodiments illustrated in FIG. 8 et seq. While the invention is described, by way of example, as applied to a steering system for a car, this has been done simply for convenience in explanation. The invention is generally applicable to hydraulic systems which provide an output in response to a rotational angular velocity of an operating shaft or a rotational angular velocity combined with a rotational angle of the same.

Figure 9:
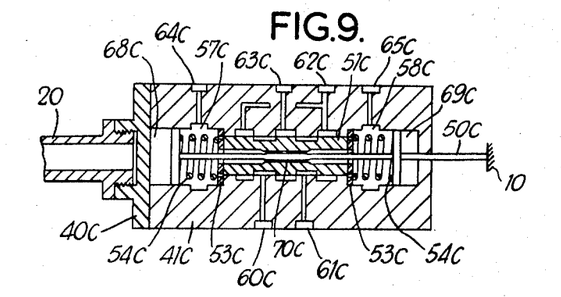
FIG. 9 is a cross-sectional view showing the control valve illustrated in FIG. 8 on an enlarged scale and in more detail.

An embodiment of the invention applied to a separate power steering system to give an output responsive to the rotational angular velocity of the steering wheel will be described with reference to FIGS. 8 and 9. A relay rod 20 has its one end fixedly secured to a cover of an open center control valve 22c and the other end connected to tie rods 28, which steer front wheels 24, which are pivotably supported on king pins (not shown), by the intermediary of knuckle arms 26, about the king pins. A hydraulic pump 34 is connected to provide a feed path for pressurized oil through the control valve 22c to an actuator 32. The output actuator 32 is of the fluid motor type and has one end pivotably secured to the relay rod 20 with a pin joint and the other end pivotably secured to a body frame 10 with a pin joint. A hydraulic pump 114 is driven by a steering shaft or input actuator 16c through the intermediary of gears 110 and 112 and communicates with the control valve 22c through appropriate piping.

The other parts similar to those of the known system described with reference to FIG. 3 are designated by reference numerals which are derived by substracting 900 from the corresponding reference numerals in FIG. 3, and a description of those parts is omitted, since it overlaps with the description of FIG. 3.

When the steering wheel 14 is turned, the pump 114 is driven by the steering shaft 16c through the intermediary of the gears 110 and 112. The pressurized oil delivered by the pump 114 is led to the control valve 22c to cause a displacement, as described later, which is applied to the control valve 22c as an input displacement to switch the path of the pressurized oil fed from the other hydraulic pump 34 through the control valve 22c and lead the pressurized oil to the actuator 32. The output displacement of the actuator 32 is delivered to the relay rod 20 to steer the front wheels 24.

The control valve 22c is described in more detail with reference to FIG. 9. The relay rod 20 is threadedly secured to a cover 40c of the control valve 22c. A valve body 41c is fixedly secured to the cover 40c by bolt fastening. A spool shaft 50c is fixedly secured to the body frame 10. Reference numeral 51c designates a spool, numeral 53c designates washers with openings, and reference numeral 54c designates springs which have a centering function for the spool shaft 50c and the spool 51c. Ports 60c and 61c communicate with the actuator 32, a port 62c communicates with the hydraulic pump 34, a port 63c communicates with the oil reservoir, and ports 64c and 65c communicate with the hydraulic pump 114. Reference numerals 57c and 58c, respectively, designate chambers for receiving the pressurized oil through the ports 64c and 65c. An orifice 70c is provided between the spool shaft 50c and the spool 51c, which allows the pressurized oil in the respective oil chambers 57c and 58c to pass therethrough to control the pressure difference between the respective chambers. Reference numerals 68c and 69c designate chambers for permitting the movement of the spool shaft 50c, relative to the valve body 41 c.

When the spool 51c is at its neutral position with respect to the valve body 41c, the pressurized oil fed to the port 62c is directly led to the port 63c as is conventional with an open center valve, and no oil flows through the ports 60c and 61c. When the spool 51c is displaced relative to the valve body 41c, pressurized oil fed through the port 62c is led to either the port 60c or the port 61c, depending upon the direction of the displacement. Then the operating oil led to the other port 61c or 60c returns to the port 63c.

In operation when the hydraulic pump 114 is driven by the steering shaft 16c it discharges a given amount of oil per unit rotational angle of the steering wheel 14. Therefore, the flow rate of the oil discharged from the pump 114 is proportional to the rotational angular velocity of the steering wheel 14. The orifice 70c produces a difference in oil pressure in the chambers 57c or 58c which is proportional to the flow rate of the operating oil passing therethrough. By balancing the resilient force exerted by the springs 54c tending to center the spool with respect to the spool shaft with this pressure difference, a displacement between the spool shaft 50c and the spool 51c which is proportional to the pressure difference is obtained. Therefore, this relative displacement is proportional to the rotational angular velocity of the steering wheel 14. If there is no discharge of oil from the pump 114, then there is no relative displacement between the spool shaft 50c and the spool 51c, owing to the centering function of the springs 54c.

Since a switching valve function is given to the combination of the spool 51c and the valve body 41c, an output displacement may be obtained from the control valve 22c in response to an input which is proportional to the rotational angular velocity of the steering wheel 14. This output can, by means of actuator 32, be delivered to the relay rod 20 and to the front wheels 24. Also, the displacement proportional to the angular velocity is advanced in phase by 90° with respect to the displacement proportional to the angle. Therefore, the above-described embodiment obviates the aforementioned disadvantages associated with the known power steering system.

An application of the present invention to an integral power steering system will now be described with reference to FIGS. 10 to 12.

Figure 10:
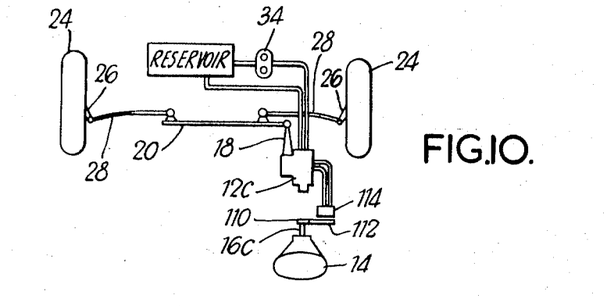
FIG. 10 is a schematic view showing one example of a hydraulic system according to the present invention as applied to an integral power steering system for a car.

In FIG. 10, a gear box 12c is supported by a body frame (not shown). The gear box 12c is connected, on its output side, to a relay rod 20 via a pitman arm 18, and an input torque applied to the gear box 12c is amplified therein with the aid of an actuator. The relay rod 20 is connected to tie rods 28 which steer the front wheels 24, which are pivotably supported on king pins (not shown), by the intermediary of knuckle arms 26, about the king pins. A hydraulic pump 34 is connected by appropriate piping to provide a feed path for pressurized oil through a control valve within the gear box 12c. Another hydraulic pump 114 is driven by a steering shaft 16c through the intermediary of gears 110 and 112, and communicates with the control valve within the gear box 12c through appropriate piping. Numeral 14 designates a steering wheel or input actuator.

When the steering wheel 14 is operated to displace the steering shaft 16c, the pressurized oil fed from the pump 114 is led to the control valve within the gear box 12c to produce a displacement as described later. This displacement serves as an input displacement for the control valve within the gear box 12c, and switches the pressurized oil from the pump 34 through the control valve within the gear box 12c. The output displacement of gear box 12c is derived at the pitman arm 18 to steer the front wheels 24.

Figures 11, 12, 12A, 13:
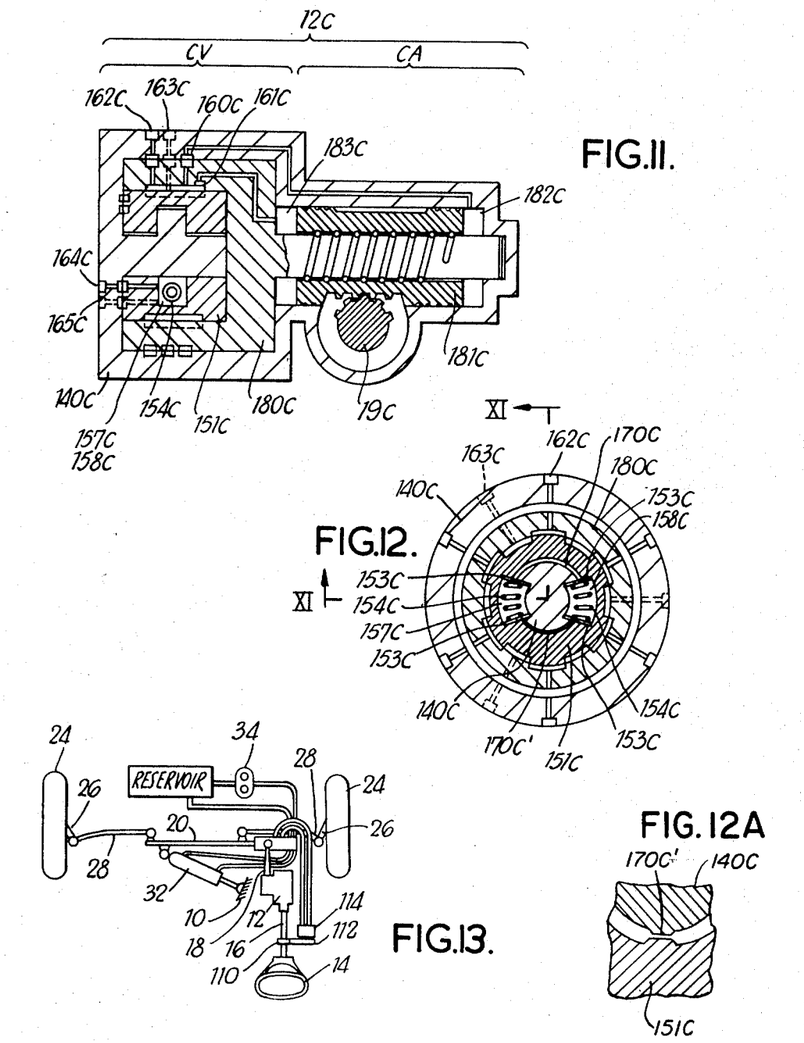
FIG. 11 is a developed view of the section taken along line XI — XI of FIG. 12.
FIG. 12 is a transverse cross-sectional view showing the detailed structure of the valve illustrated in FIG. 11.
FIG. 12a is an enlarged cross-sectional view showing detail of the orifice valve.
FIG. 13 is a schematic view showing another embodiment of a hydraulic system according to the present invention applied to a separate power steering system for a car.

The gear box 12c is illustrated in greater detail in FIGS. 11 and 12. In FIG. 11, the section marked CV is an open center control valve in the form of a rotary valve, corresponding to the member 22c in the separate system. The section marked CA is an output actuator section of the fluid motor type, corresponding to the member 32 in the separate system. A nut 181c and a pinion shaft 19c are meshed with each other. The nut 181c also serves as a piston in the actuator. One end of a member 180c serves as an operating shaft which threadedly engages the nut 181c in the actuator section and the other end of the member functions as a rotary valve housing. The nut 181c is subjected to rectilinear motion in the lengthwise direction of the operating shaft upon rotation of the operating shaft. This causes the pitman arm 18 to rock, as the pitman arm is directly coupled to a pinion shaft 19c which is in turn meshed with the nut 181c. A housing 140c is fixedly secured to the body frame (not shown). A rotor 151c is interposed around the outer periphery of the bearing portion of the housing 140c. The rotor 151c has a valve function in cooperation with the rotary valve housing section of the member 180c. Reference numeral 153c designates washers with openings, and reference numeral 154c designates springs which have a centering function for the rotor 151c with respect to the bearing portion of the housing 140c. Ports 160c and 161c communicate with the oil chambers 182c and 183c, respectively, of the actuator, a port 162c communicates with the hydraulic pump 34, a port 163c communicates with the oil reservoir and ports 164c and 165c communicate with the hydraulic pump 114. Reference numerals 157c and 158c designate chambers for receiving pressurized oil from the ports 164c and 165c, respectively. Orifices 170c and 170c' are provided between the housing 140c and the rotor 151c, which allows the pressurized oil in the respective oil chambers 157c and 158c to pass therethrough to control the pressure difference between the respective chambers. As more clearly seen in FIG. 12a the orifice 170c' is depicted. Only one of which is shown because both are symmetrically disposed relative to each other.

In the above-described gear box, when the rotor 151c is at a neutral position with respect to the rotary valve housing section of the member 180c, the pressurized oil fed through the port 162c is directly passed to the port 163c as is conventional in an open center valve and no oil flows through the ports 160c and 161c. When the rotor 151c is displaced with respect to the member 180c, the pressurized oil fed through the port 162c is led either through the port 160c to the oil chamber 182c or through the port 161c to the oil chamber 183c, depending upon the direction of the displacement. Then the operating oil led to the other port 161c or 160c returns to the port 163c.

In operation, the hydraulic pump 114 is driven by the steering shaft or input actuator 16c to discharge a given amount of oil per unit rotational angle of the steering wheel 14. Therefore, the flow rate of the oil discharged from the pump 114 is proportional to the rotational angular velocity of the steering wheel 14. The orifices 170c and 170c' produce a difference in pressure between the chambers 157c and 158c which is proportional to the flow rate of the operating oil passing therethrough. By balancing the resilient force exerted by the springs 154c tending to center the rotor with respect to the bearing portion of said housing, with the pressure difference, a displacement between the housing 140c and the rotor 151c which is proportional to the pressure difference is obtained. Therefore, this relative displacement is proportional to the rotational angular velocity of the steering wheel 14. If there is no discharge of oil from the pump 114, then there is no relative displacement between the housing 140c and the rotor 151c, owing to the centering function of the springs 154c.

In the above-described embodiment an output displacement is obtained from the gear box 12c in response to an input which is proportional to a rotational angular velocity of the steering wheel. This output is delivered to the relay rod 20 and the front wheels 24 by the intermediary of the pitman arm 18. The displacement proportional to the angular velocity is advanced in phase by 90° with respect to the displacement proportional to the angle. This embodiment improves over the U.S. Pat. No. 3,491,846 because the external reaction springs (i.e. the spring appearing at the rightmost extremity of piston rod 60, and the spring appearing at the rightmost extremity of member 58a) are not necessitated. The phase advancing of this embodiment is accomplished by the pump means.

In the embodiments shown in FIGS. 8 to 12, as there is no mechanical connection between the steering wheel and the open center control valve, the freedom of layout of the system is considerable. For instance, the tilt, telescopic and swing (leftward and rightward rocking) adjustments can be made as desired in accordance with the driving position. In addition, since the steering column is substantially eliminated, there should occur no protrusion of the steering column upon collision, which results in increased safety. Also, there is another advantage that a steering wheel is not always necessary; instead a grip handle or a wrist handle can be employed.

Now embodiments of the present invention will be described with reference to FIGS. 13 to 19. In these embodiments, an input responsive to a rotational angular velocity of a steering wheel and an input responsive to a rotational angle of the steering wheel are applied to obtain one combined output which serves to switch the hydraulic circuits to steer the front wheels.

In FIG. 13, reference numeral 10 designates a part of a body of a car. On the body frame 10 is supported a gear box 12, which is coupled to a steering shaft or input actuator 16 provided with a steering wheel 14 at one end. The rotational motion of the steering shaft 16 is reduced in velocity while the torque is amplified within the gear box 12, and the movement is transmitted to the control valve 22 through the intermediary of the pitman arm 18. A relay rod 20 is fixedly secured at one end to the housing of the control valve 22, and the relay rod 20 is connected to tie rods 28 which steer the front wheels 24, which are pivotably supported on king pins (not shown), by the intermediary of knuckle arms 26, about said king pins. A hydraulic pump 34 is connected to provide a feed path for pressurized oil through a control valve to an output actuator 32 of the fluid motor type. The actuator 32 is pivotably secured at one end to the relay rod 20 and at the other end to the body frame 10 by means of pin joints. Another hydraulic pump 114 is driven by the steering shaft 16 by the intermediary of the gears 110 and 112 and communicates with the control valve 22 through appropriate piping.

In the aforementioned system, when the steering wheel 14 is turned, then the pitman arm 18 is displaced through the intermediary of the steering shaft 16 and the gear box 12. In addition, another displacement, to be described later, is produced by leading the pressurized oil from the pump 114 to the control valve 22. These two displacements are applied to the control valve 22 as its input displacement for switching the pressurized oil fed from the pump 34 to lead it to the actuator 32. The output displacement of the actuator 32 is derived at the relay rod 20 to steer the front wheels 24.

Figure 14:
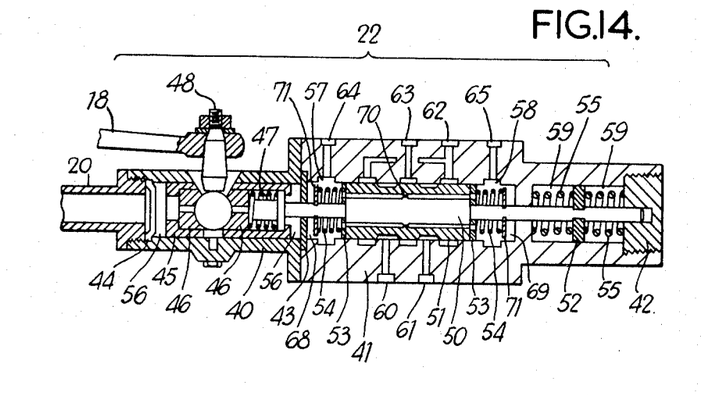
FIG. 14 is a cross-sectional view showing the control valve illustrated in FIG. 13 on an enlarged scale and in more detail.

FIG. 14 is a detailed cross-sectional view of the control valve 22 which forms the switching valve section in the system according to the present invention as illustrated in FIG. 13. In FIG. 14 the relay rod 20 is threadedly secured to the outer housing 40. A valve body 41 is secured to the outer housing 40 by bolt fastening. An end plug member 42 serves as a receiver for springs 55, and is threadedly secured to the valve body 41. A seat member 43 serves as a partition plate between the valve body 41 and the outer housing 40. Reference numeral 44 designates a dust cover. The combination consisting of the outer housing 40, the valve body 41, the combined spring receiver and end plug member 42 and the seat member 43, is subjected to movement with the relay rod 20.

The above-described pitman arm 18 is connected to a ball stud 48. The ball stud 48 is accommodated within an inner cylinder 45 and held by ball seats 46 on the opposite sides. A spring 47 is provided to press the ball seats 46 onto the ball stud 48 from one side thereof. Numeral 50 designates a spool shaft. The combination consisting of the pitman arm 18, the inner cylinder 45, the ball seats 46, the spring 47, the ball stud 48 and the spool shaft 50, can move in the lengthwise direction of the shaft. Reference numeral 51 designates a spool and numerals 52 and 71, respectively, designate stoppers which are both fixedly secured to the spool shaft 50. Reference numeral 53 designates washers with openings, and numeral 54 designates springs whose function is to center the spool 51 with respect to the spool shaft 50. Reference numeral 55 designates springs whose function is to center the stopper 52, and therefore the spool shaft 50, with respect to the valve body 41.

Ports 60 and 61 communicate with the actuator 32, a port 62 communicates with the pump 34, a port 63 communicates with the oil reservoir, and ports 64 and 65 communicate with the pump 114. Spaces 56 are provided to permit movement of the inner cylinder 45, which are filled with oil or grease lubricant. Chambers 57 and 58 are provided for receiving pressurized oil from the respective ports 64 and 65 and chambers 59 are provided to accommodate the springs 55 which are provided on the opposite side of the stopper 52. The stopper is fixedly and integrally secured to the spool shaft 50. Chambers 68 and 69 are provided to permit movement of the spool shaft 50 rather than oil chambers. An orifice 70 is provided between the spool shaft 50 and the spool 51, to allow the pressurized oil in the respective oil chambers 57 and 58 to pass therethrough and thereby to control the pressure difference between the oil chambers.

In the open center control valve illustrated in FIG. 14, when the spool 51 is at a neutral position with respect to the valve body, the pressurized oil fed to the port 62 is directly led to the port 63, and no oil flows through the ports 60 and 61. When the spool 51 is displaced with respect to the valve body 41, the pressurized oil fed through the port 62 is led to the port 60 or 61 depending upon the direction of displacement. Then the operating oil led to the other port 60 or 61, returns to the port 63.

The displacement of the spool 51 consists of the sum of the displacement of the spool shaft 50, that is, the displacement produced by the steering wheel 14 causing movement of the pitman arm 18, which is transmitted via the ball stud 48 to the inner cylinder 45, plus the relative displacement between the spool shaft 50 and the spool 51. The relative displacement between the spool shaft 50 and the spool 51 arises when the hydraulic pump 114 is driven by the steering shaft 16 to discharge a given amount of oil per unit rotational angle of the steering wheel 14. Therefore, the flow rate of the oil discharged from the pump 114 is proportional to the rotational angular velocity of the steering wheel 14. The orifice 70 produces a difference in oil pressure in the two oil chambers 57 and 58 which is proportional to the flow rate of the operating oil passing therethrough. By balancing the resilient force exerted by the springs 54, which tend to center the spool 50 with respect to the spool shaft, with this pressure difference, a displacement between the spool shaft 50 and the spool 51 which is proportional to the pressure difference is obtained. Therefore, this relative displacement is proportional to the rotational angular velocity of the steering wheel 14. If no oil is discharged from the pump 114, then there is no relative displacement between the spool shaft 50 and the spool 51, owing to the centering effect of the springs 54.

Thus an output displacement in response to a combined input consisting of an input proportional to the rotational angle of the steering wheel 14 plus input proportional to the rotational angular velocity of the steering wheel 14 may be obtained. This output acts via the actuator 32 upon the relay rod 20 and also, therefore, on the front wheels 24. Since the displacement proportional to the angular velocity of rotation of the steering wheel is advanced in phase by 90° with respect to the displacement proportional to the angle, as a whole a phase advancing effect arises.

A further embodiment of the invention, applied to an integral power steering system, will now be described with reference to FIGS. 16 to 19.

Figure 16:
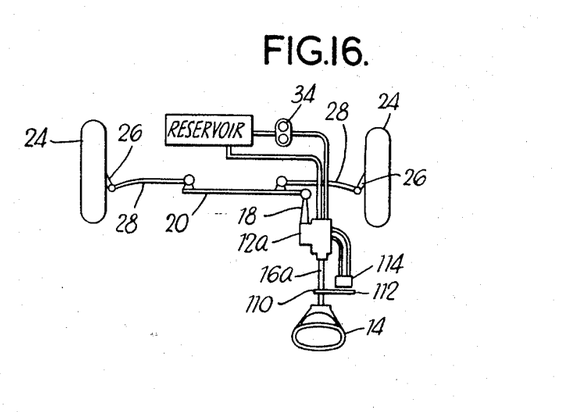
FIG. 16 is a schematic view showing another embodiment of a hydraulic system according to the present invention applied to an integral power steering system for a car.

In FIG. 16, a gear box 12a is supported by a body frame (not shown) and is connected to a steering shaft or input actuator 16a which is provided with a steering wheel 14. The rotational motion of the steering shaft 16a is reduced in velocity while the torque is amplified with the aid of an actuator within the gear box 12a, transmitted to a pitman arm 18 on the output side of the gear box and then to the relay rod 20. The relay rod 20 is connected to tie rods 28 which steer the front wheels 24, which are pivotably supported on king pins (not shown), by the intermediary of knuckle arms 26, about said king pins. A hydraulic pump 34 is connected by appropriate piping so as to form a feed path for pressurized oil through a control valve within the gear box 12a. Another hydraulic pump 114 is driven by the steering shaft 16a by the intermediary of gears 110 and 112, and communicates with the control valve within the gear box 12a through appropriate piping.

When the steering wheel 14 is operated the steering shaft 16a is displaced and pressurized oil from the pump 114 is led to the control valve within the gear box 12a to produce another displacement as explained later. These two displacements are applied to the control valve within the gear box 12a as its input displacement to switch the pressurized oil fed from the pump 34 by means of the control valve within the gear box 12a, and the output displacement is derived at the pitman arm 18 to steer the front wheels.

Figure 17:
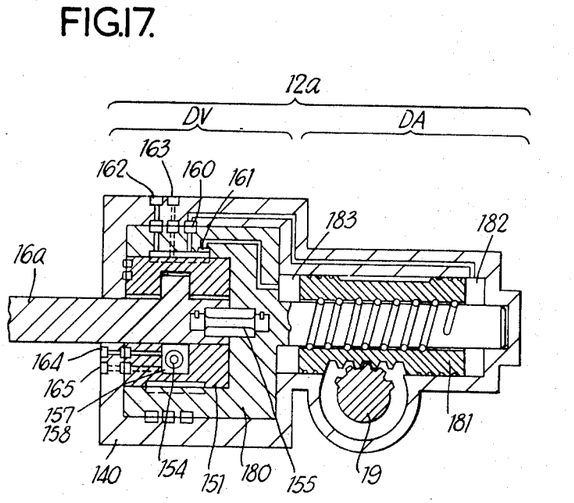
FIG. 17 is a developed view of the section taken along line XVII — XVII of FIG. 18.
Figure 18:
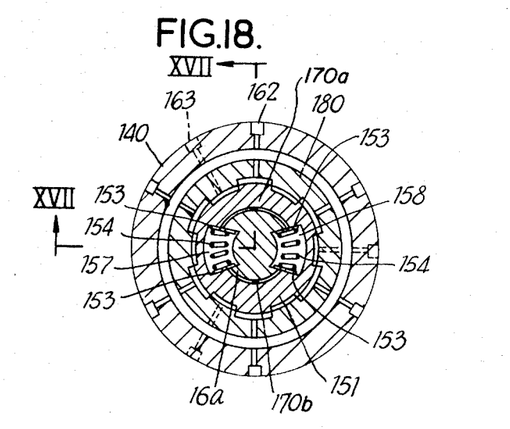
FIG. 18 is a cross-sectional view showing detail of the valve illustrated in FIG. 17.
Figure 19:
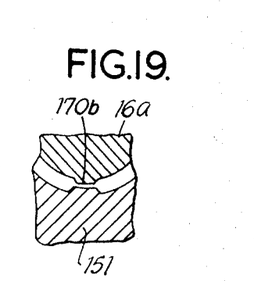
FIG. 19 is an enlarged cross-sectional view showing detail of the orifice illustrated in FIG. 18.

The structure of the gear box 12a is explained in more detail with reference to FIGS. 17 to 19. In FIG. 17, the section marked DV is an open center control valve section in the form of a rotary valve, corresponding to the member 22 in the separate system. The section marked DA is an output actuator section of the fluid motor type, corresponding to the actuator 32 in the separate system. A nut 181 and a pinion shaft 19 are directly coupled to the pitman arm 18 and are meshed with each other to form a reduction gear section. The nut 181 can also serve as a piston in the actuator. One end of a member 180 serves as an operating shaft which threadedly engages with the nut 181 in the actuator section DA and the other end functions as a rotary valve housing. The nut 181 is subjected to rectilinear motion in the lengthwise direction of the operating shaft upon rotation of the operating shaft. This causes the pitman arm 18 to rock, as the pitman arm is directly coupled to the pinion shaft 19 which is in turn meshed with the nut 181. A housing 140 is fixedly secured to the body frame (not shown). A rotor 151 is positioned around the outer periphery of the steering shaft 16a and has a valve function in cooperation with the rotary valve housing section of the member 180. Reference numeral 153 designates washers with openings, and reference numeral 154 designates springs which function to center the rotor 151 with respect to the steering shaft 16a. A torsion bar 155 is fixedly secured to the steering shaft 16a and the member 180 by means of knock pins in order to provide a centering function between said respective members. Ports 160 and 161 communicate with the oil chambers 182 and 183, respectively, of the actuator, a port 162 communicates with the hydraulic pump 34, port 163 communicates with the oil reservoir and ports 164 and 165 communicate with the hydraulic pump 114. Reference numerals 157 and 158 designate chambers for receiving pressurized oil from the ports 164 and 165. Orifices 170a and 170b are provided between the steering shaft 16a and the rotor 151, which allows the pressurized oil in the respective oil chambers 157 and 158 to pass therethrough to control the pressure difference between the respective chambers.

In operation, when the rotor 151 is at a neutral position with respect to the member 180, the pressurized oil fed through the port 162 is directly passed to the port 163 as is conventional with an open center control valve and no oil flows through the ports 160 and 161. When the rotor 151 is displaced with respect to the member 180, the pressurized oil fed through the port 162 is led either through the port 160 to the oil chamber 182 or through the port 161 to the oil chamber 183, depending upon the direction of displacement. Then the operating oil led to the other port 160 or 161 returns to the port 163.

The displacement of the rotor 151 consists of the sum of the displacement of the steering shaft 16a plus the relative displacement between the steering shaft 16a and the rotor 151. How the relative displacement between the steering shaft 16a and the rotor 151 arises is explained as follows. The hydraulic pump 114 is driven by the steering shaft 16a to discharge a given amount of oil per unit rotational angle of the steering wheel 14. Therefore, the flow rate of the oil discharged from the pump 114 is proportional to the rotational angular velocity of the steering wheel 14. The orifices 170a and 170b produce a pressure difference between the oil chambers 157 and 158 which is proportional to the flow rate of the operating oil therethrough. By balancing the resilient force exerted by the springs 154 with this pressure difference, a displacement between the steering shaft 16a and the rotor 151 which is proportional to the pressure difference is obtained. Therefore, this relative displacement is proportional to the rotational angular velocity of the steering wheel 14.

Since a switching valve function is given to the combination of the rotor 151 and the rotary valve housing section of the member 180, an output displacement in response to the combined input consisting of an input proportional to the rotational angle of the steering wheel 14 plus another input proportional to the rotational angular velocity of the steering wheel 14, may be obtained at the relay rod 20 and transmitted to the front wheels 24 by the intermediary of the pitman arm 18. Since the displacement proportional to the angular velocity is advanced in phase by 90° with respect to the displacement proportional to the angle, as a whole a phase advancing effect is revealed.

Figure 15:
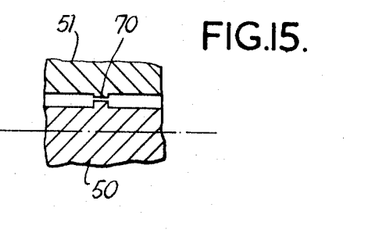
FIG. 15 is an enlarged cross-sectional view showing detail of the orifice of the valve illustrated in FIG. 14.

It is to be noted that while the control valve 22 was illustrated in the embodiment in FIGS. 13 to 15 so as to be operated with a rectilinear motion as a representative example of the application of the invention to a separate power steering system, the present invention may be readily applied also to a control valve operated with a rotational motion, and that while the control valve illustrated in the embodiment in FIGS. 16 to 19 was a rotary valve, a valve using rectilinear motion could, of course, be used.

What we claim is:

1. A hydraulic system which comprises a hydraulic pump, which is adapted to discharge a predetermined amount of oil per unit displacement of an actuating means, connected to a control unit which includes a housing in which there are two oil chambers, a communicating path interconnecting the two oil chambers to permit restricted flow of oil between the two oil chambers, a member which is movable, from a neutral position relative to the housing, in response to a difference in oil pressure between the said two oil chambers and resilient means which act upon the movable member to restore it to the said neutral position, the arrangement being such that upon displacement of an actuating means, the hydraulic pump discharges oil to one of the said oil chambers, thereby creating a pressure difference between the said two oil chambers which pressure difference causes displacement of the said movable member, whereby the movable member is displaced by an amount proportional to the velocity of displacement of the actuating means.

2. A hydraulic system as claimed in claim 1 in which a displacement responsive to the amount of displacement of the actuating means is applied to the movable member, in addition to the displacement proportional to the velocity of displacement of the actuating means.

3. A hydraulic system as claimed in claim 1 adapted for use with an actuating means which is a rotatable shaft, the displacement of the shaft being an angular displacement about the axis of the shaft.

4. A steering system for a vehicle including a hydraulic system as claimed in claim 3.

5. A hydraulic system as claimed in claim 2 adapted for use with an actuating means which is a rotatable shaft, the displacement of the shaft being an angular displacement about the axis of the shaft.

6. A system as defined in claim 5, wherein there is provided:

e. an output member,
  f. an output actuating means connected to said output member for effectuating movement of said output member, said control unit is operatively connected to said output actuating means, and
  g. a second hydraulic pump means for selectively supplying motive fluid to said output actuating means, through said control unit in response to said displacement of said movable means so as to effectuate movement of said output member.

7. A system as defined in claim 6, wherein said actuating means is a steering wheel, said output member is a steering means for a vehicle, said control unit is an open-center valve, and said output actuating means is a fluid motor.

8. A hydraulic system which comprises:

a. an input actuating means having a displacement movement,
  b. a hydraulic pump means connected to said input actuating means for discharging a predetermined amount of actuating fluid per unit displacement of said input actuating means,
  c. a control unit connected to said hydraulic pump means and including:
     1. a housing means,
     2. two fluid chamber means located within said housing means for receiving actuating fluid,
     3. a path means interconnecting said two fluid chambers to permit restricted flow of actuating fluid between said two fluid chambers,
     4. a movable means disposed within said housing means for displacement from a neutral position relative to said housing means in response to a difference in actuating fluid pressure between said two fluid chambers, and
     5. resilient means which coact with said movable means to restore said movable means to said neutral position, and
  d. said hydraulic pump means discharges actuating fluid to one of said fluid chambers in response to displacement of said input actuating means, thereby creating a pressure difference between said two fluid chambers which is sufficient in magnitude and proportional to velocity of displacement of said actuating means to displace said movable member from said neutral position by a distance which is proportional to the velocity of displacement of said actuating means.

9. A system as defined in claim 8, wherein there is provided:

e. an output member,
  f. an output actuating means connected to said output member for effectuating movement of said output member, said control unit is operatively connected to said output actuating means, and
  g. a second hydraulic pump means for selectively supplying motive fluid to said output actuating means, through said control unit in response to said displacement of said movable means so as to effectuate movement of said output member.

10. A system as defined in claim 9, wherein said input actuating means is a steering wheel, said output member is a steering means for a vehicle, said control unit is an open-center valve, and said output actuating means is a fluid motor.

11. A system as defined in claim 8, wherein:

h. mechanical means connect said input actuating means to said movable means so as to displace said movable means from said neutral position relative to said housing means by an amount proportional to the displacement magnitude of said input actuating means.

12. A system as defined in claim 11, wherein said mechanical means is operative to longitudinally displace said movable means.

13. A system as defined in claim 11, wherein said mechanical means is operative to angularly displace said movable means.

14. A system as defined in claim 8, wherein said movable means is mounted for longitudinal displacement from said neutral position relative to said housing means.

15. A system as defined in claim 1, wherein said movable means is mounted for angular displacement from said neutral position relative to said housing means.

16. A system as defined in claim 9, wherein said housing means comprises:
 i. a member having one end that is operative as a housing for said movable means and another end which is directly connected to said output actuating means.

17. A system as defined in claim 13, wherein said housing means comprises:
 j. a member having one end that is operative as a housing for said movable means and another end which is directly connected to said output actuating means.

* * * * *